United States Patent [19]

Nusbaum

[11] Patent Number: 4,537,414
[45] Date of Patent: Aug. 27, 1985

[54] COMBINATION CAR SEAT AND STROLLER

[76] Inventor: Ronnie W. Nusbaum, 68640 Balk Rd., Sturgis, Mich. 49091

[21] Appl. No.: 477,283

[22] Filed: Mar. 21, 1983

Related U.S. Application Data

[63] Continuation-in-part of Ser. No. 293,116, Aug. 17, 1981, abandoned.

[51] Int. Cl.³ ............................................. B62B 7/10
[52] U.S. Cl. ......................... 280/47.41; 280/47.37 R; 297/344
[58] Field of Search ........ 280/30, 31, 414 A, 33.99 B, 280/638, 643, 644, 646–648, 650, 657, 658, 87.02 W, 87.03, 47.37 R, 47.38, 47.4, 47.41; 296/1 B; 297/130, 344, 250, 253–256, 216, 384, 377

[56] References Cited

U.S. PATENT DOCUMENTS

| | | | |
|---|---|---|---|
| 2,574,743 | 11/1951 | King | 280/47.38 |
| 2,624,395 | 1/1953 | Johnson | 280/47.41 |
| 3,116,069 | 12/1963 | Dostal | 280/648 |
| 3,207,528 | 9/1965 | Hasche | 280/47.38 |
| 3,223,431 | 12/1965 | Gottfried et al. | 280/47.38 |
| 3,463,504 | 8/1969 | Petry et al. | 280/47.37 R |
| 3,944,241 | 3/1976 | Epelbaum | 280/47.37 R |

Primary Examiner—Joseph F. Peters, Jr.
Assistant Examiner—Ross Weaver
Attorney, Agent, or Firm—Flynn, Thiel, Boutell & Tanis

[57] ABSTRACT

A child seating device which is adapted for use either as a protective car seat or as a stroller includes a child support having a seat for the child and having first and second approximately vertical openings behind the seat. A wheeled base has an upright rod thereon which is slidably received in the first opening and a locking mechanism is provided to releasably secure the rod and child support against relative movement in positions in which the base is adjacent and spaced from the child support. A handle which has a manually engageable grip has a downwardly extending rod thereon which is slidably received in the second opening, and a locking mechanism is provided for releasably securing such rod against movement relative to the child support in positions in which the handle is adjacent and spaced from the child support.

9 Claims, 4 Drawing Figures

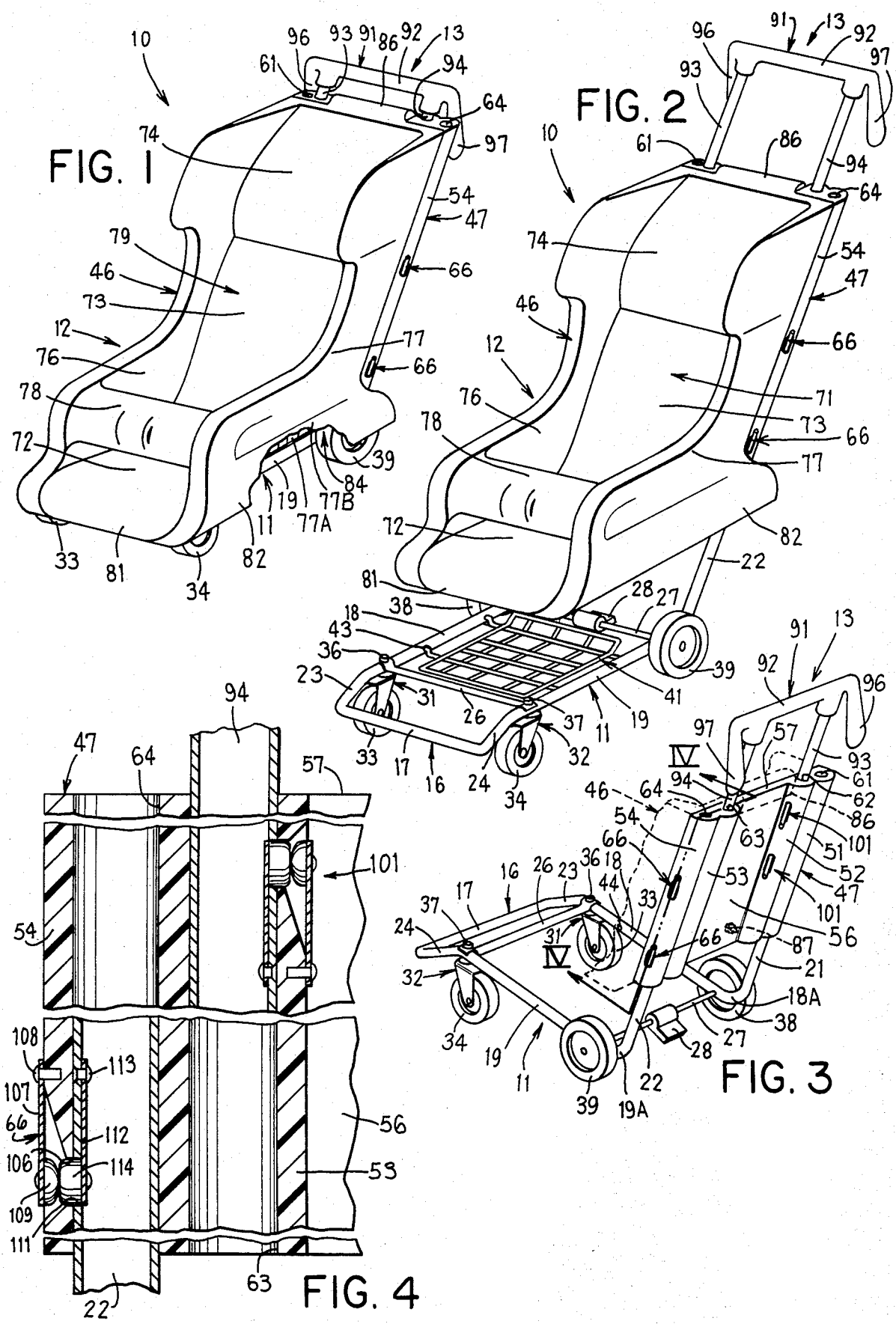

COMBINATION CAR SEAT AND STROLLER

CROSS-REFERENCE TO RELATED APPLICATION

This application is a continuation-in-part of U.S. Ser. No. 293 116, filed Aug. 17, 1981, now abandoned.

FIELD OF THE INVENTION

This invention relates to a child seating device and, more particularly, to such a device which is adapted for use both as a protective car seat and as a stroller.

BACKGROUND OF THE INVENTION

In recent years, there has been a trend toward increased use of protective car seats for small children in order to minimize the risk of injuries in the event of an automobile accident. In fact, at least one state has enacted legislation requiring that children under a specified age be placed in a protective seat during travel by automobile. Frequently, when a destination is reached, it is also desirable to have a stroller in which to place the infant. Thus, the average family faces the prospect of having to transport both a car seat and a stroller for each small child. In view of the fact that the size of the average car is continuously decreasing, due to efforts to increase fuel efficiency, the amount of available storage space is frequently limited. This is particularly true when the average family takes an extended trip by automobile and must also transport luggage in the car.

A related consideration is the expense involved in purchasing both a car seat and a stroller for each small child. This is particularly troublesome for families having two or more small children.

An additional problem is the time and effort required to transfer a child from the car seat to the stroller and vice versa. This is particularly cumbersome in certain common situations, for example where the weather is bad, where the child is sleeping and/or where a number of frequent stops must be made, such as on a local shopping trip.

Car seats have been developed which can be adapted for movable support on wheels after removal from the car. Such devices are, for example, disclosed in German Offenlegungsschrift Nos. 23 30 967 and 28 14 584. Although these devices have generally been adequate for their intended purposes, however, they have not been satisfactory in all respects. For example, neither of these devices is an entirely self-contained unit which can be easily converted into a stroller is convenient to use and maneuver while simultaneously being stable and safe.

Accordingly, it is an object of the invention to provide an improved child seating device which is entirely self-contained and can be used either as a protective car seat or as a stroller.

A further object of the present invention is to provide a child seating device, as aforesaid, which is relatively compact and lightweight.

A further object of the invention is to provide a child seating device, as aforesaid, which is rugged and requires little or no maintenance, and can be quickly and easily converted from a car seat to a stroller and vice versa.

A further object of the invention is to provide a child seating device, as aforesaid, which is designed to minimize the risk of serious injury to the child in the event of an automobile accident.

A further object of the invention is to provide a child seating device, as aforesaid, which is stable, safe and easily maneuverable when used as a stroller.

A further object of the invention is to provide a child seating device, as aforesaid, which is relatively simple and inexpensive to manufacture and assemble.

SUMMARY OF THE INVENTION

The foregoing objects of the invention are met by providing a combination car seat and stroller which includes a child support having a seat for the child and having first and second approximately vertical openings behind the seat. A base which has wheels rotatably supported thereon for movably supporting it on a floor surface has an upright rod thereon which is slidably received in the first opening in the child support. A mechanism cooperable with the upright rod and the child support is provided for releasably securing the child support against movement relative to the rod in two positions in which the child support is respectively spaced from and adjacent the base. A handle having a manually engageable grip thereon has a downwardly extending rod which is slidably received in the second opening in the child support. A further locking mechanism is provided for releasably securing the child support and downwardly extending rod against relative movement in two positions in which the handle is respectively adjacent and spaced from the child support.

In a preferred embodiment, the child support includes a seat member support having the vertical openings therein, a seat member which has the seat thereon, and a mechanism for releasably securing the seat member to the seat member support. This mechanism preferably includes a hook on an upper rear portion of the seat member which is adapted to grip over an upper edge of the seat member support, an opening through a lower portion of the seat member support, a threaded stud on the seat member which extends through such opening, and a nut which threadedly engages the stud on the side of the seat member support remote from the seat member.

BRIEF DESCRIPTION OF THE DRAWINGS

FIG. 1 is a fragmentary perspective view of a child seating device embodying the present invention;

FIG. 2 is a perspective view of the child seating device of FIG. 1 in a different position of operation;

FIG. 3 is a perspective view of the child seating device of FIG. 1, a seat member and a parcel support which are components thereof being omitted for clarity; and FIG. 4 is a fragmentary sectional view taken along the line IV—IV of FIG. 3.

Certain terminology is used in the following description for convenience in reference and should not be considered limiting. For example, the words "up", "down", "front" and "rear" will designate directions in the drawings to which reference is made. The words "in" and "out" will respectively refer to directions toward and away from the geometric center of the child seating device and designated parts thereof. Such terminology will include the words specifically mentioned, derivatives thereof and words of similar import.

DETAILED DESCRIPTION

Referring to FIGS. 1 and 2, a child seating device 10 includes a base 11, a child support 12 and a handle 13.

The base 11 includes a frame 16 which is a single, elongate tubular member bent to substantially a U-shape. The frame 16 includes a bight 17 and spaced, approximately parallel legs 18 and 19 which extend rearwardly from respective ends of the bight 17. The legs 18 and 19 are each bent at respective locations 18A and 19A (FIG. 3) which are spaced from the bight 17 so that the ends of legs 18 and 19 remote from the bight 17 define parallel rods 21 and 22 which extend upwardly with a small rearward incline. The bight 17 and the portions of legs 18 and 19 between the bight 17 and bends 18A and 19A preferably extend substantially horizontally, although the front end portions 23 and 24 of the legs 18 and 19 can be inclined to extend slightly downwardly, as best shown in FIGS. 2 and 3.

A brace 26 extends between and is secured to the legs 18 and 19 of the frame 16 a short distance from the bight 17. A brace 27 extends between and is secured to the legs 18 and 19 of the frame 16 in the region of the upwardly extending rods 21 and 22. The brace 27 is fixed against rotation about its lengthwise axis and has a footrest 28 thereon which is fixed against rotation with respect thereto. The footrest 28 is preferably made of a molded plastic material.

Wheel support mechanisms 31 and 32, which in the preferred embodiment are conventional castors, are secured to the legs 18 and 19 of the frame 16 in the region of the brace 26, and each supports a respective front wheel 33 or 34 for rotation about a horizontal axis and for pivotal movement about a vertical axis. In the preferred embodiment, the wheel support mechanisms 31 and 32 have upright threaded studs thereon which extend upwardly through aligned openings in the brace 26 and the legs 18 and 19 of the frame 16, and nuts 36 and 37 threadedly engage the upper ends of such studs to secure the brace 26 and the wheel support mechanisms 31 and 32 to the frame 16.

Rear wheels 38 and 39 are respectively supported on the legs 18 and 19 of the frame 16 in the region of the brace 27 and upright rods 21 and 22 for rotation about a horizontal axis. More specifically, the brace 27 extends through and slightly beyond the legs 18 and 19 of the frame 16, and the wheels 38 and 39 are rotatably supported on the ends of the brace 27 and maintained against outward axial movement by snap rings provided at each end of the brace 27.

The base 11 also includes an optional parcel support 41 (FIG. 2) which is a grid of interconnected metal wires. The ends 43 of two spaced, laterally extending metal wires extend laterally outwardly beyond the grid and are received in openings 44 (FIG. 3) provided in the legs 18 and 19 of the frame 16, thereby supporting the grid.

The child support 12 includes a seat member 46 and a seat member support 47, which in the preferred embodiment are each a separate, integral, plastic injection molded part. As shown in FIG. 3, the seat member support 47 includes four approximately vertically extending tubes 51–54, the tubes 51 and 52 being adjacent each other and spaced from the tubes 53 and 54, which are adjacent each other, and includes an approximately vertically extending plate 56 which extends between the tubes 52 and 53 and has an upper edge 57. The vertical openings through the tubes 51–54 are respectively designated by reference numerals 61–64.

The rods 21 and 22 on the base 11 have diameters which are slightly smaller than and are slidably received in the vertical openings 61 and 64. The annular outer edges of the upper ends of the rods 21 and 22 are preferably beveled to prevent the rods from scraping material from the inner surfaces of the openings 61 and 64. Alternatively, tubular cylindrical metal liners could be provided within the openings 61 and 64 to provide surfaces substantially impervious to wear caused by the ends of the rods 21 and 22. Two locking mechanisms 66, which are described in detail hereinafter, are provided on each of the tubes 51 and 54 to releasably secure the seat member support 47 and rods 21 and 22 against relative movement in a position in which the child support 12 is adjacent to base 11 (FIG. 1) and a position in which the child support 12 is spaced from the base 11 (FIG. 2).

The seat member 46 has a contoured surface 71 which can optionally be padded in a conventional manner for comfort and includes a generally horizontal seat portion 72, a generally vertical back portion 73 extending upwardly from the rear of the seat portion 72, and a head rest 74 provided above the back portion 73. Side walls 76 and 77 are provided on opposite sides of the contoured surface 71 and extend upwardly from the seat portion 72 and forwardly from the back portion 73 and head rest 74. A reinforcing bar 78 extends between and is secured to the side walls 76 and 77 above the front edge of the seat portion 72.

Side wall 76 is symmetric to side wall 77 and thus only side wall 77 is described and illustrated in detail. Side wall 77 is defined by two laterally spaced and generally parallel walls 77A and 77B (FIG. 1). The downwardly curved lower front edge portion 81 of the seat portion 72 and the lower edge portions of the outer walls of the side walls 76 and 77, as at 81, extend downwardly beyond the seat portion 72 to define a downwardly open recess below the seat portion 72 which substantially receives the base 11 when the base 11 is in its position adjacent the seat member 46, as shown in FIG. 1. The edge portion 82 is also flared downwardly and outwardly somewhat to define a wheel well 84 which receives the rear wheel 39.

A hook 86 (FIGS. 1 and 3) is provided on the upper rear portion of the seat member 46. The hook 86 can be placed over the upper edge 57 of the seat member support 47 in order to removably support the seat member 46 on the seat member support 47 in an essentially cantilevered manner. Referring to FIG. 3, a rearwardly extending stud 87 provided on the lower rear portion of the seat member 46 extends through an opening provided in the lower portion of the plate 56 and has a nut threadedly engaged therewith on the side of the plate 56 remote from the seat member 46.

The handle 13 includes an elongate, tubular member 91 which is bent to approximately a U-shape and has a horizontally extending bight 92 and two downwardly extending and substantially parallel legs or rods 93 and 94 which are respectively slidably received in the vertical openings 52 and 53 of the seat member support 47. The annular edges of the lower ends of rods 93 and 94 are preferably beveled. Two projections 96 and 97 are provided at respective ends of the bight, extend downwardly and rearwardly therefrom, and serve as manually engageable grips. If desired, the bight 92 and projections 96 and 97 can be coated with a rubber or plastic material in order to ensure secure manual gripping thereof, as shown in FIG. 2. As shown in FIG. 3, two further locking mechanisms 101 are provided on each of the tubes 52 and 53 to releasably secure the rods 93 and 94 against vertical movement relative to the seat member support 47 in a position in which the grips 96 and 97 of the handle are adjacent the child support 12 (FIG. 1) and in a position in which the grips 96 and 97 are spaced from the child support 12 (FIG. 2).

The locking mechanisms 66 and 101 are substantially identical in structure, and therefore only one of the locking mechanisms 66 is described in detail. The locking mechanism 66 shown in FIG. 4 includes an opening 106 which is provided through a wall of the tube 54 and diverges outwardly. A flexible metal strip 107 has one end secured to the outer surface of the tube 54 adjacent the opening 106 in any convenient manner, for example by a rivet or screw 108. The metal strip 107 extends over the opening 106 and has secured to its end remote from rivet 108 an inwardly projecting button 109 which is aligned with the opening 106. The tubular rod 22 has an opening 111 through a wall thereof which can be aligned with the opening 106 and has a flexible metal strip 112 therein which is secured to the rod 22 a short distance above the opening 111 by a rivet 113. A button 114 is secured to the other end of the strip 112 and projects outwardly through the opening 111 and the opening 106, thereby releasably locking the rod 22 and tube 54 against relative movement. The edges of the adjacent ends of the buttons 109 and 114 are preferably rounded, as shown in FIG. 4.

When the seating device 10 is in the configuration of FIG. 2, the upper ends of rods 21 and 22 and the lower ends of rods 93 and 94 still extend a sufficient distance into the respective openings 51-54, preferably 30% to 50% of the length of the tubes 51-54, to keep the seating device 10 relatively rigid and thus give it the requisite stability.

Although no retaining straps for securely fastening a child in the seating device 11 are illustrated in the drawings, it will be recognized that the seating device 11 could be equipped with such straps in a conventional manner.

OPERATION

When the child seating device 10 is utilized as a protective car seat, the base 11 and handle 13 are in their positions adjacent the child support 12, as shown in FIG. 1, and are releasably maintained in these positions by the locking mechanisms 66 and 101. When the child seating device 10 has subsequently been removed from the automobile and is to be converted to the stroller configuration shown in FIG. 2, a foot is placed on the footrest 28 to hold the base 11 on the ground and the lower ends of the metal strips 107 of the two upper locking mechanisms 66 are manually pressed inwardly, so that the buttons 109 press the buttons 114 inwardly until the buttons 114 have been moved out of the openings 106. The child support 12 can then be pulled upwardly relative to the base 11, the rods 21 and 22 sliding within the tubes 51 and 54, until the buttons 114 are aligned with and are moved by the resiliency of the metal strips 112 into the openings 106 of the lower locking mechanisms 66, thereby releasably securing the child support 12 in the spaced, cantilevered position above the base 11 (FIG. 2). Then, the two lower locking mechanisms 101 are manually released in a similar manner and the handle 13 is pulled upwardly relative to the child support 12 until the two upper locking mechanisms 101 engage to releasably secure the handle 13 in the position shown in FIG. 2 in which the manually engageable grips 96 and 97 are spaced from the child support 12. The child seating device 10 can now be utilized as a stroller.

The child seating device 10 is returned to the protective car seat configuration shown in FIG. 1 by performing substantially the same steps described above, but in a reverse sequence.

Although a preferred embodiment of the invention has been disclosed in detail for illustrative purposes, it will be recognized that there are variations or modifications of the disclosed apparatus, including the rearrangement of parts, which lie within the scope of the present invention.

The embodiments of the invention in which an exclusive property or privilege is claimed are defined as follows:

1. A child seating device adapted for use as a protective car seat and as a stroller, comprising:

a child support having a seat member for a child, said seat member having an upright back supporting portion and a generally horizontally aligned seat portion extending forwardly from the lower portion of said back supporting portion, said child support further having means defining first and second openings on the reawardly facing side of said back supporting portion and extending parallel to the longitudinal extent of said back supporting portion;

sidewall means extending downwardly from the lower peripheral edge of said seat portion at the front and two sides thereof to define a downwardly and rearwardly opening recess immediately below said seat portion;

a U-shaped base having a bight and two generally parallel legs, said bight and legs extending approximatley horizontally and parallel to said seat portion, said base further having a pair of upwardly extending rods contiguous with the ends of each of said legs remote from said bight and being slidingly received in said first openings in said child support, said legs of said base having wheels rotatably supported thereon for movably supporting said base on a floor surface, said bight and legs of said base being oriented beneath said seat portion and parallel thereto with said bight being located adjacent said front of said seat member and said two legs extending rearwardly therefrom;

means cooperable with said two upwardly extending rods and said child support for releasably securing said child support against movement relative to said upwardly extending rods in first and second positions thereof, said bight, legs and wheels being housed between said sidewall means in said first position and lowered downwardly out of said sidewall means in said second position, the parallel relationship between said bight, parallel legs and said seat portion being maintained throughout a movement between said first and second positions by the sliding connection between said upwardly extending rods and child support;

a handle including a manually engagable grip and two downwardly extending rods thereon being slidably received in said second openings in said child support; and means for releasably securing said child support and downwardly extending rod against relative movement in a third position in which said handle is adjacent said child support and a fourth position in which said handle is spaced from said child support.

2. The device of claim 1, including a brace which extends between and is secured to said legs of said base in the region of said upwardly extending rods, and including a footrest secured to said brace between said legs of said base.

3. The device of claim 1, including first wheel support means supporting two of said wheels on said legs of said base in the region of said bight for pivotal movement about respective vertical axes and rotational movement about respective horizontal axes, and including second wheel support means supporting two further said wheels on the respective legs of said base in the region of said upwardly extending rods for rotational movement about a substantially horizontal axis.

4. The device of claim 1, wherein said U-shaped frame and said upwardly extending rods are respective portions of a single elongate, bent member.

5. The device of claim 1, wherein said handle includes a generally U-shaped member having a generally horizontal bight and two substantially parallel, downwardly extending legs, said bight being a portion of said handle and said legs being said downwardly extending rods, and including projections which are secured to said bight of said U-shaped member adjacent respective ends thereof and extend downwardly and rearwardly therefrom, said projections being said manually engageable grips.

6. The device of claim 1, wherein said child support includes a seat member support having said first and second vertical openings therein, a seat member having said seat thereon, and means for releasably interconnecting said seat member and said seat member support.

7. The device of claim 6, wherein said means for releasably interconnecting said seat member and said seat member support includes means defining an upper edge on said seat member support, means defining a hook on an upper rear portion of said seat member which is adapted to grip over said upper edge of said seat member support, means defining a further opening through a lower portion of said seat member support, a threaded stud on said seat member which extends through said further opening in said seat member support, and a nut which threadedly engages said threaded stud on the side of said seat member support remote from said seat member.

8. The device of claim 6, wherein said seat member and seat member support are molded plastic parts.

9. The device of claim 1, wherein said base includes means for supporting a parcel when said child support and said base are in said second position relative to each other.

* * * * *